Patented Apr. 7, 1925.

1,532,213

UNITED STATES PATENT OFFICE.

HERBERT A. WINKELMANN, OF AKRON, OHIO, ASSIGNOR TO THE B. F. GOODRICH COMPANY, OF NEW YORK, N. Y., A CORPORATION OF NEW YORK.

RENEWED RUBBER AND PROCESS FOR PRODUCING THE SAME.

No Drawing.     Application filed July 11, 1923.  Serial No. 650,969.

*To all whom it may concern:*

Be it known that I, HERBERT A. WINKELMANN, a citizen of the United States, residing at Akron, in the county of Summit and State of Ohio, have invented a certain new and useful Renewed Rubber and Process for Producing the Same, of which the following is a specification.

This invention relates to the reclaiming or regeneration of rubber and comprises a new method of renewing the plastic properties of vulcanized scrap.

The standard alkali process for reclaiming vulcanized rubber produces a semi-plasticized reclaim which does not flux into a rubber mix as smoothly nor as uniformly as fresh raw rubber. To overcome this difficulty certain softening ingredients are added to the reclaimed rubber, preferably after heating in the devulcanizers and during the refining process. Even after such additions the reclaim tends to be granular in structure as compared with unvulcanized rubber.

The use of high temperatures and excess of softener is often resorted to in order to produce a uniform and plastic reclaim but such practice is attended by material decreases in tensile strength and is therefore inferior.

The object of my invention is the renewal, in vulcanized rubber, of the plastic properties found in crude rubber and which are lost by vulcanization.

A second object is the production of a plastic reclaimed rubber substantially free from the granular structure usually present in reclaims and which will mill as smoothly as a crude rubber mix.

I find that the reaction products of aldehydes and aromatic amines have the property of plasticizing vulcanized rubber, giving a reclaim with remarkable freedom from granular structure which will work smoothly on a rubber mill. In the preferred embodiment of my invention I use aldehyde-amines which are not accelerators of the vulcanization process or which are active only to a small extent, since thereby the "balance" or time and temperature of cure of a rubber mix is not substantially changed by the addition of my renewed rubber.

For example, 1 add 5% of aldol-alphanaphthylamine or of furfurol-ortho-toluidine to comminuted solid tire scrap by mechanical mixing. The mix is then heated for 2 to 3½ hours in vacuo to a temperature of 287° F. to 292° F. The product is then masticated, reworked or refined in a suitable manner as on a rubber mill where it fluxes smoothly and uniformly substantially the same as unvulcanized rubber.

The main purpose of the vacuum is to avoid oxidation of the rubber, but as the plasticizing agent employed is itself a good age-resister in the renewed rubber I do not regard the use of a vacuum as absolutely essential.

The regenerated rubber, so obtained, equals or excels the alkali reclaim from the same scrap when used in rubber mixes for tire treads, inner tubes, heels, hose and belts, giving a more uniform product with higher tensiles, greater resistence to abrasion, and showing far better age-resisting qualities.

Example 2. Pneumatic tires, after removal of the beads, are comminuted and treated with acid for the removal of the cotton fabric. Such acidized scrap (95 parts by weight) is mixed with 5 parts of aldol-naphthylamine and heated in vacuo for 2½ hours at 45 lbs. steam pressure. The regenerated rubber will sheet out like an unvulcanized mix while the alkali reclaim from the same scrap never gives a smooth stock. The aldehyde-amine treated reclaim is approximately 10% cheaper than the alkali reclaim and gives tensiles equal or better when cured with 5% of sulfur.

Example 3. Inner tube, or other so-called pure-gum or practically-pure vulcanized scrap, does not give a satisfactory alkali reclaim but after treatment with aldehyde-amines as in the above examples, it gives a smooth reclaim of greater value for replacing fresh rubber in rubber goods.

Example 4. Aldehyde-amines do not destroy cotton fabric and are therefore desirable in plasticizing ground whole tires for the production of a reclaim containing fibers.

I also find that valuable renewed rubber may be obtained by milling ground scrap rubber such as inner tube scrap with aldehydeamines on a hot mill. I may also heat the scrap rubber with an aqueous emulsion of the aldehyde-amine or I may add the aldehyde and the amine, separately, to the rubber and allow them to react during the heating process.

I also find that alkali reclaims may be further plasticized by milling with three to five per cent of an aldehyde-amine whereby most or all of the granular nature is removed, or that the alkali reclaiming method may be caused to yield a more plastic product by adding the aldehyde-amine to the mix during the performance of that method instead of milling into the product afterward. Scorched mill batches of unvulcanized rubber may also be so treated to remove the lumps and are thereby improved for reuse.

The advantages of my process comprise cheapness, adaptability to a wider variety of scrap rubber, production of reclaims having a substantial high degree of uniformity, smoothness in action on rubber mills, higher physical properties after revulcanization and improved age-resisting qualities.

I do not wholly limit myself to the specific percentages of softener described, nor to any particular conditions of time or temperature during the regenerating process, since it is obvious that such factors will vary according to the types of scrap rubber to be renewed and according to the properties desired in the finished product.

I claim:

1. A process for renewing the plastic properties of vulcanized rubber which comprises incorporating with vulcanized rubber a condensation product of an aldehyde and an aromatic amine.

2. A process for renewing the plastic properties of vulcanized rubber which comprises comminuting vulcanized rubber, mixing it with the condensation product of an aldehyde and an aromatic amine, and heating the mixture.

3. A process for renewing the plastic properties of vulcanized rubber which comprises intermixing vulcanized rubber in a comminuted condition with the condensation product of an aldehyde and an amine, and heating the mixture in vacuo.

4. A process for renewing the plastic properties of vulcanized rubber which comprises mixing vulcanized rubber in a comminuted condition with the condensation product of an aldehyde and an amine, heating the mixture and then masticating it.

5. A process according to claim 1, in which the plasticizing agent is an aldol condensation product of an amine.

6. A process according to claims 1 and 5 in which the plasticizing agent is an aldol-alpha-naphthylamine.

7. A process according to claim 1 in which the plasticizing agent is of a substantially non-accelerating character in subsequent vulcanization with other rubber.

8. A process of renewing rubber which comprises reclaiming vulcanized rubber by ordinary means such as the alkali method, and incorporating with the reclaimed rubber the condensation product of an aldehyde and an amine.

9. A process according to claim 1 in which the condensation product is obtained by adding its ingredients to the mix and causing their reaction within the mix.

10. A process of renewing the plastic properties of vulcanized rubber which comprises incorporating with vulcanized rubber in a comminuted condition the condensation product of an aldehyde and an organic amine.

11. A process of renewing the plastic properties of vulcanized rubber which comprises incorporating with vulcanized rubber in a comminuted condition the condensation product of an aldehyde having two or more carbon atoms, and an amine or ammonia.

12. Renewed vulcanized rubber having incorporated therewith a plasticizing agent consisting of the reaction product of an aldehyde and an aromatic amine.

13. Renewed vulcanized rubber mechanically plasticized with a substantially non-accelerating condensation product of an aldehyde and an amine.

14. Renewed vulcanized rubber mechanically plasticized with aldol-alpha-naphthylamine.

In witness whereof I have hereunto set my hand this 9th day of July, 1923.

HERBERT A. WINKELMANN.